United States Patent
Yamaguchi

(10) Patent No.: US 7,573,960 B2
(45) Date of Patent: Aug. 11, 2009

(54) NARROW BAND INTERFERENCE CANCELLATION TECHNIQUE FOR OFDM TRANSMITTERS

(75) Inventor: Hirohisa Yamaguchi, Barak (JP)

(73) Assignee: Texas Instruments Incorporated, Dallas, TX (US)

( * ) Notice: Subject to any disclaimer, the term of this patent is extended or adjusted under 35 U.S.C. 154(b) by 581 days.

(21) Appl. No.: 11/356,780

(22) Filed: Feb. 17, 2006

(65) Prior Publication Data
US 2007/0195898 A1    Aug. 23, 2007

(51) Int. Cl.
*H03D 1/04*    (2006.01)
(52) U.S. Cl. ..................... 375/346
(58) Field of Classification Search ................. 375/346
See application file for complete search history.

(56) References Cited

OTHER PUBLICATIONS

Hirohisa Yamaguchi, "Active interference cancellation technique for MB-OFDM cognitive radio," 2004, 34th European microwave conference, pp. 1105-1108.*

* cited by examiner

*Primary Examiner*—Kevin Y Kim
(74) *Attorney, Agent, or Firm*—Robert D. Marshall, Jr.; Wade J. Brady, III; Frederick J. Telecky, Jr.

(57) ABSTRACT

A computational algorithm provides new and effective interference cancellation of the in-band spurious signals for the Orthogonal Frequency Division Multiplex (OFDM) transmitters. This new interference cancellation transmits non-zero tones may be used to cancel the interference generated by the modulated data signals. This minimizes the number of tones used and maximizes the interference suppression achieved at the same time. The technique described is one of active interference cancellation (AIC).

2 Claims, 6 Drawing Sheets

NARROW BAND INTERFERENCE CANCELLATION TECHNIQUE FOR OFDM TRANSMITTERS

TECHNICAL FIELD OF THE INVENTION

The technical field of this invention is cancellation of the in-band spurious signals for the Orthogonal Frequency Division Multiplex (OFDM) transmitters.

BACKGROUND OF THE INVENTION

Ultra Wide-Band (UWB) technology based on Multi-Band OFDM (MB-OFDM) is considered the next likely industry standard for the near-distance high data-rate communication technology. Unlike conventional licensed wireless services such as cellular phone, broadcast TV, satellite TV, earth surveillance satellite, weather and airborne radar, UWB radio is an unlicensed radio technology using the frequency range of 3.1 to 10.6 GHz which overlays with conventional service bands. In order to eliminate the possibility of UWB interference victimizing these incumbent services, the revised Federal Communications Commission (FCC) Rules limits the transmission power level of UWB to be below −41.25 dBm/MHz within the 3.1 GHz to 10.6 GHz frequency range.

In OFDM, each tone (subcarrier) is modulated by quadrature amplitude modulation (QAM) or quaternary phase shift keying (QPSK). When a subcarrier is modulated, its bandwidth expands from a single frequency (bandwidth zero) to a non-zero bandwidth. OFDM includes a number of such modulated tones at pre-defined frequency intervals.

Currently the UWB industry targets 3.1 to 5 GHz because this more limited frequency range is better served by existing technology. The broad definition of the UWB band has been officially accepted by other regulatory authorities including the European Union and authorities in Asia. The emission level limitations are subject regional regulatory approval.

FIG. 1 illustrates the spectrum of an OFDM transmission having 128 tones. Each tone occupies 4.125 MHz space for a total active bandwidth of 528 MHz. This MB-OFDM transmission occupies this 528 MHz band within the 3.1 to 10.6 GHz frequency range. At a carrier frequency of 3.8 GHz the allowed transmission power is:

$P_T$=−41.25 dBm+10 log 528 dBm $P_T$=−41.25 dBm+27.23 dBm $P_T$=−14.02 dBm

FIG. 1 also illustrates two sidebands of unwanted interference 101 and 102 accompanying the transmission band 100. These two sidebands 101 and 102 are only 20 dB below the magnitude of the OFDM spectrum bandwidth signals 100. They represent significant potential interference to victimize potential competing services in the frequency ranges 101 and 102.

The users of the bands protected by ITU-R Recommendation and Regional Radio Law have raised strong objection to this transmission power level. These users include radio astronomy groups using the bands 3269 to 3267 MHz, 3332 to 3339 MHz and 3345.8 to 3352.5 MHz. Only those radio astronomy bands below 4.7 GHz are listed because the 3.1 to 4.7 GHz band is of greater commercial interest due to the accompanying impact on chip manufacturing cost.

In MB-OFDM each OFDM symbol consists of 128 sub-carriers and thus the bandwidth of each symbol is 500 MHz. Three such bands are placed in-between 3.1 and 4.9 GHz and symbols are transmitted using these bands sequentially. A radio system in the 3.1 to 5 GHz band will be hit by at least one of the MB-OFDM bands. Thus some means of protecting the potentially victimized bands is needed.

There are a number approaches proposed to comply with the current and future requirements to protect specific bands. One obvious solution is to notch out the specific bands by narrow-band filters. However, the design of narrow-band RF-band notch filters is a challenging problem and can only be achieved at a high chip cost. Using a conventional narrow-band filter design is far from simple. The center notch frequency of the narrow band filter must be adjustable according to the regional (e.g. Europe and Japan) spectrum use.

Another approach possible only in OFDM stops the transmission of a number of the OFDM sub-carriers particularly where these ODFM sub-carriers occupy frequencies within the interference band. These OFDM sub-carriers are referred to as tones and are synonymous with spectral points on the QAM constellation diagram space. OFDM communicates information bits as a collection of modulated narrow-band tones using Fast Fourier Transform. In MB-OFDM each tone occupies a bandwidth of about 4 MHz. In order to prevent the interference within a radio astronomy bandwidth of 7 MHz, two tones located in the potentially victimized frequency band are not transmitted. These are called zeroed tones. Stopping transmission of a number of the OFDM sub-carriers is potentially more flexible than notching out the specific bands by narrow-band filters. This narrow-band notch filtering is realized by digital signal processing control of OFDM modulation. This is more attractive from the viewpoint chip implementation complexity and cost.

Each tone or subcarrier is a single frequency having a bandwidth of zero. When a subcarrier is amplitude modulated in QAM (Quadrature Amplitude Modulation) or PSK (Phase shift Keying) the resulting bandwidth is non-zero. Applying amplitude modulation causes each subcarrier to carry information. In 64 QAM, each subcarrier carries 6 bits. Eliminating a subcarrier in 64 QAM results in 6 bits being removed from one symbol.

There is a question whether stopping transmission of a number of the OFDM sub-carriers can completely solve the interference problem. Consider an example involving interference to the radio astronomy band of 7 MHz.

Elimination of the interference to a specific band is a problem of both bandwidth and attenuation level. Under the current Japan Radio Law, the acceptable unintentional ambient radiation level is −64.3 dBm/MHz. This is the peak signal power level, but in the 1 MHz bandwidth range the peak and average power levels are almost identical. Because the in-band (3.1 to 10.6 GHz) radiation of the UWB signal is limited to −41.3 dBm/MHz according to FCC Rules, one way for the UWB transmitter to coexist with the radio astronomy service is to lower the UWB interference in the radio astronomy band to the ambient noise level. This would require attenuation from 64.3 dBm/MHz to 41.25 dBm/MHz, or 23 dB attenuation to the transmitted MB-OFDM signal at the band location.

Because the radio astronomy band is 7 MHz wide, at least two OFDM tones must be eliminated (zeroed). FIGS. 2a, 2b, and 2c illustrate the effects of eliminating two, four and sixteen tones respectively. Eliminating two tones (FIG. 2a) reduces interference in the victimized band by approximately 10 dB; eliminating four tones (FIG. 2b) results in no further significant interference reduction. FIG. 2b shows an expanded frequency range for more clarity in the interference band. It is clear that the simple zero-toning method requires far more tones to be eliminated. Because the interference level is dependent on the data modulated on the tones surrounding the interference band, the required number of zeroed tones is likewise dependent on the modulated data. As illustrated in FIG. 2c, even increasing the number of zeroed tones to sixteen does not provide the required 23 dB attenuation at the designated band location. When sixteen tones eliminated and the target elimination bandwidth is 7 MHz, a full 64 MHz of OFDM signal bandwidth is sacrificed. Achieving the required 23 dB elimination would thus cause excessive degradation of the spectrum usage and lowers the communication throughput.

Summarizing the concerns and challenges described, it is clear that a more effective solution is needed that achieves the required level of interference suppression using the minimum number of sacrificed tones. This optimization task also involves issues of cost and complexity related to the hardware implementation.

SUMMARY OF THE INVENTION

The present invention describes a computational algorithm that provides new and effective interference cancellation of the in-band spurious signals for Orthogonal Frequency Division Multiplex (OFDM) transmitters. This new solution for interference cancellation transmits non-zero tones to cancel the interference generated by the modulated data signals. This minimizes the number of tones used and maximizes the interference suppression achieved at the same time. This technique is called active interference cancellation (AIC). The complexity of the hardware required to implement the algorithm is minimized. An example hardware implementation is presented.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
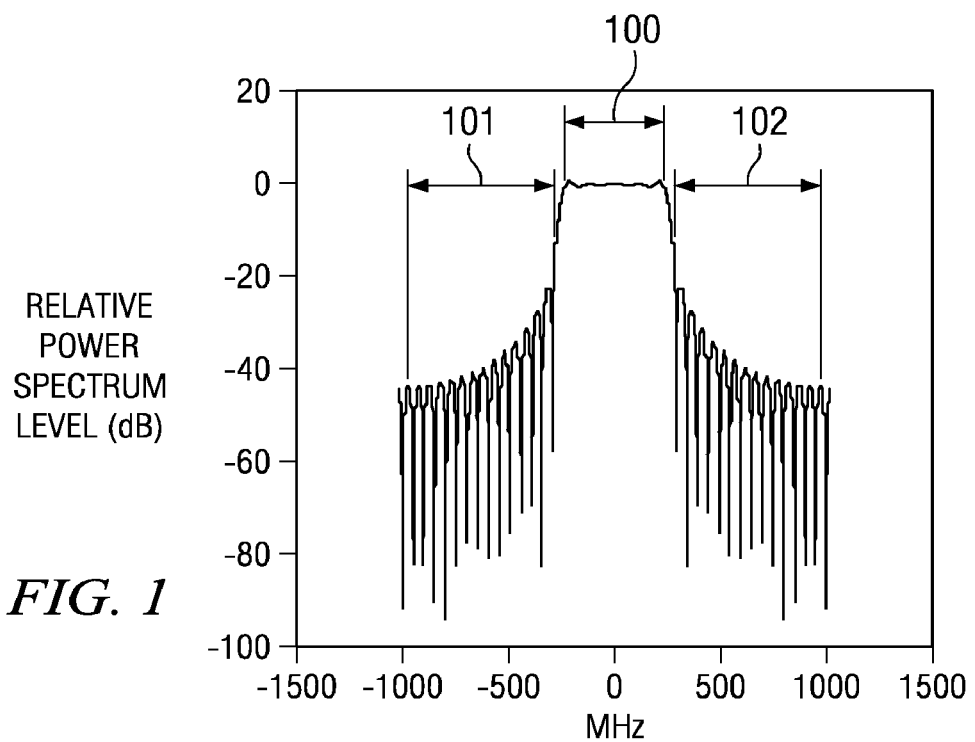
FIG. 1 illustrates the frequency spectrum of an example MB-OFDM base-band signal having 128 tones, each tone having 4.125 MHz bandwidth.
Figure 2A:
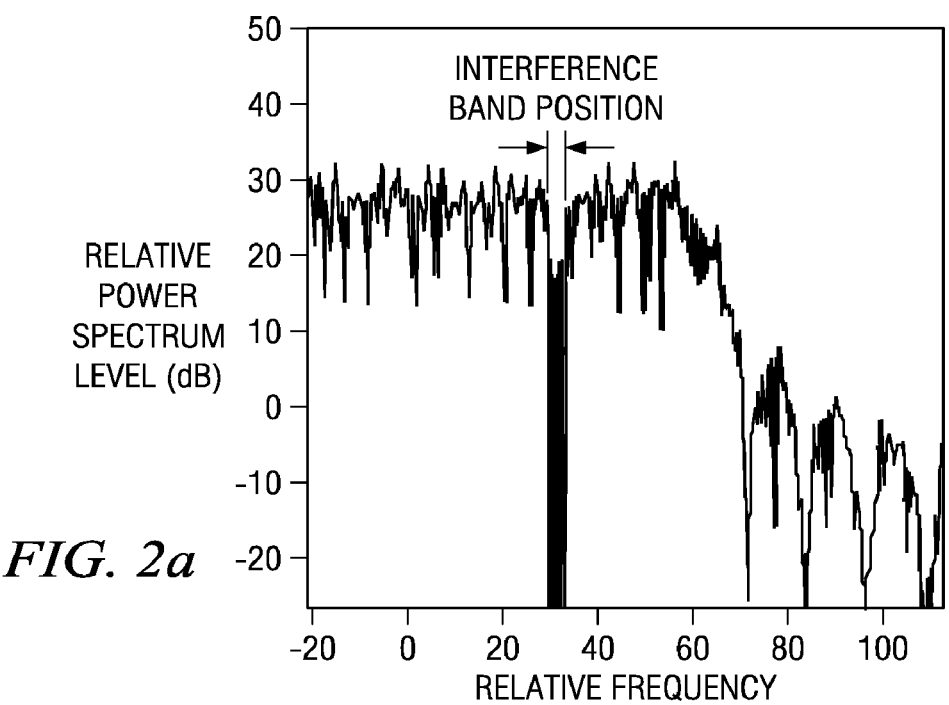
FIG. 2A illustrates a first case of suppression of the OFDM spectrum at the interference band position stopping four tones.
Figure 2B:
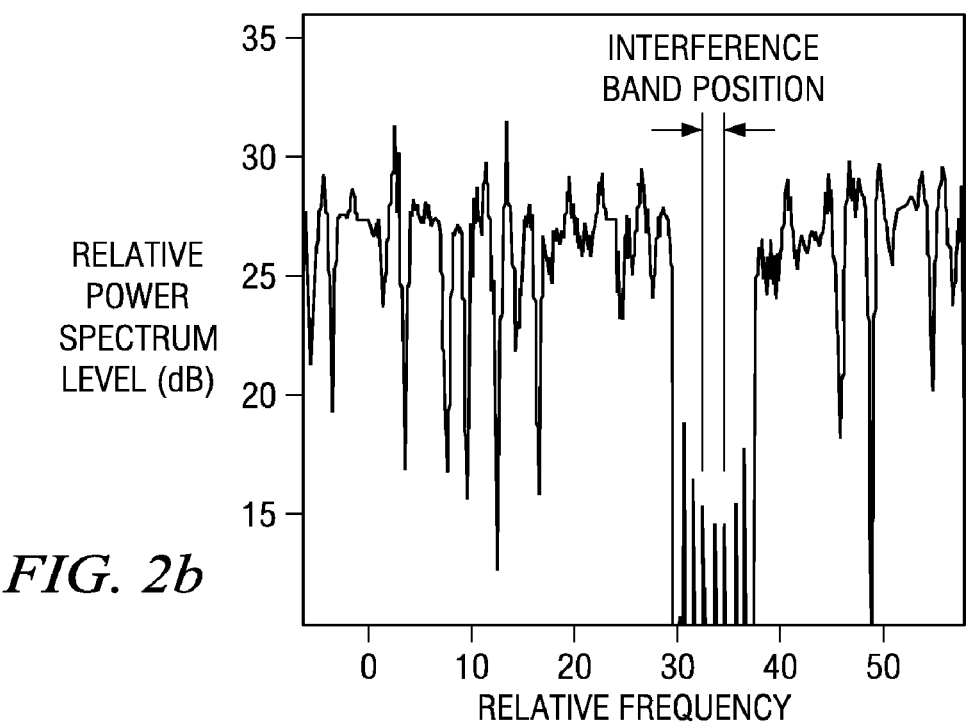
FIG. 2B illustrates a second case of suppression of the OFDM spectrum at the interference band position stopping eight tones.
Figure 2C:
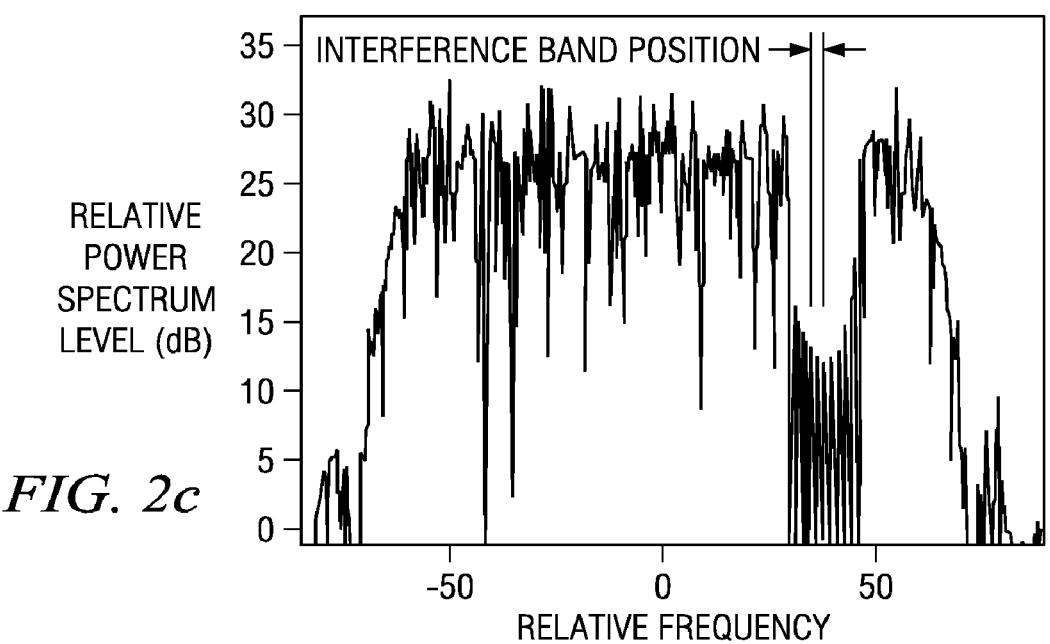
FIG. 2C illustrates a third case of suppression of the OFDM spectrum at the interference band position stopping sixteen tones.
Figure 3:
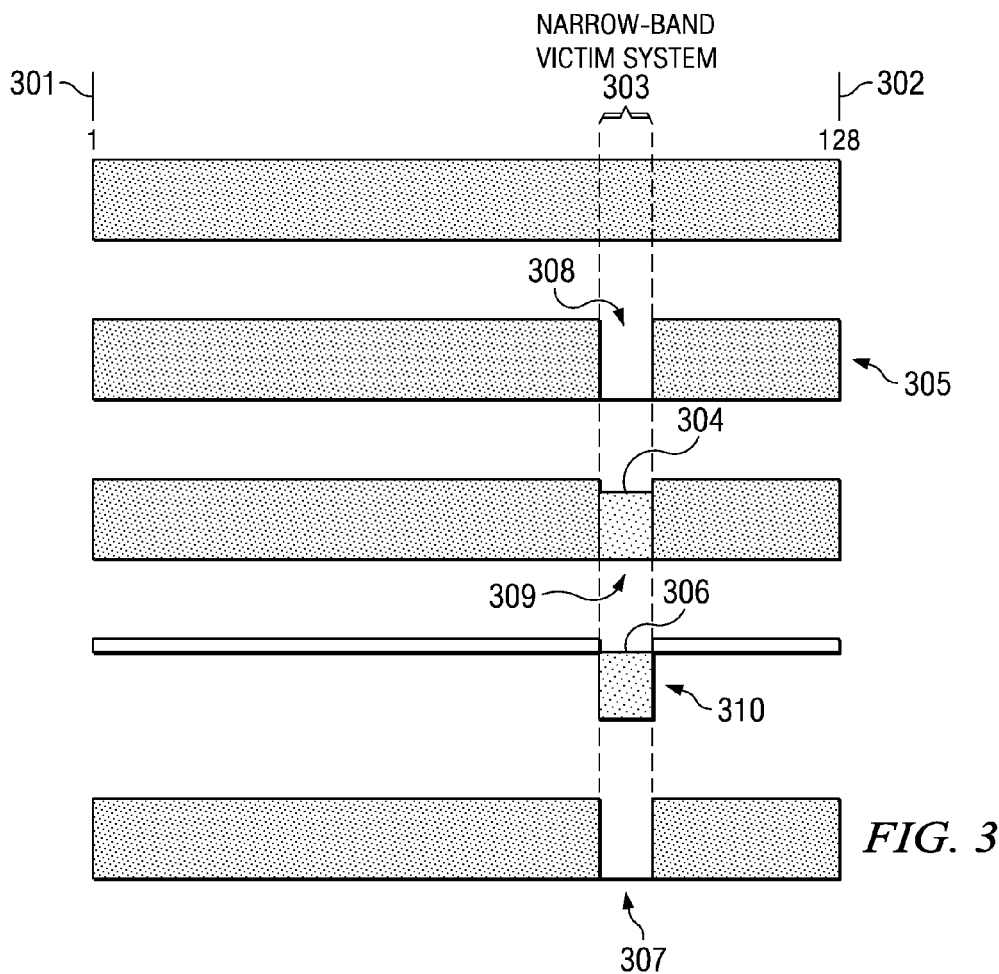
FIG. 3 illustrates the concept of active interference cancellation (AIC)

FIG. 3 illustrates the basic concept of active interference cancellation (AIC). In the MB-OFDM system, the information data is transmitted using 128 tones with the spectrum ranging from 301 to 302 of FIG. 3a. Among these 128 tones only 100 tones are actually assigned to the user data. The remaining 28 tones are reserved for system use. When this data is modulated in OFDM and transmitted, part of the spectrum shown as 303 interferes with the narrow-band victim system. FIG. 3b illustrates stopping transmission of tones within the interfering band. The direct interference to the victim band 308 is eliminated. FIG. 3c illustrates this does not guarantee the complete elimination of the interference because the tone zeroing affects only the tone center frequencies. Spurious signals from each transmitted data tone accumulate and remain relatively large as indicated by 304. Thus the elimination of a large number of tones is required to achieve the needed 23 dB attenuation.

Because the spurious signals 304 in the interfering band can be computed from the transmitted data 305 in FIG. 3b, it is also possible to compute the negative of the interference signal using the tones located within the interfering band as shown in 306 of FIG. 3d. Stated another way, the values of the tones located within the interfering band can be calculated so that the interference generated by the data tones 304 and negative of the interference generated by the tones in the interfering band 306 cause 304 and 306 to cancel each other as illustrated in 307 of FIG. 3e.

Figure 4:
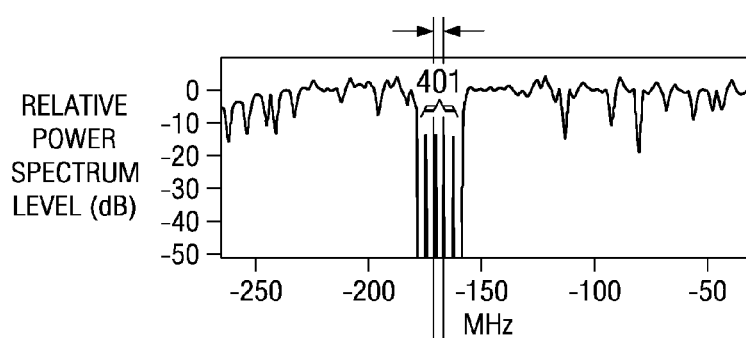
FIG. 4 illustrates a comparison of the resulting relative power spectrum level versus frequency in two interference suppression approaches (A) interference suppression by zeroing five tones from the OFDM spectrum and (B) interference suppression using AIC.
Figure 4:
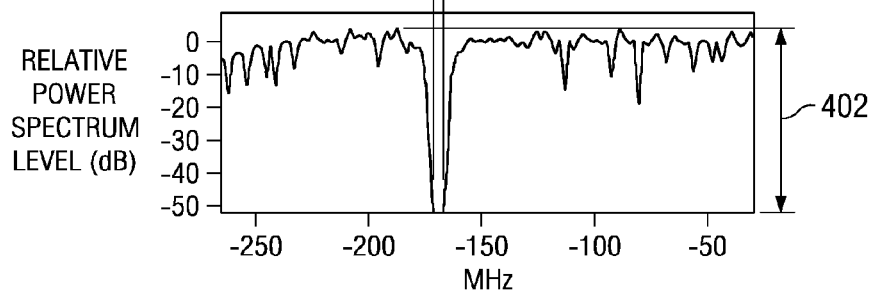
Figure 5:
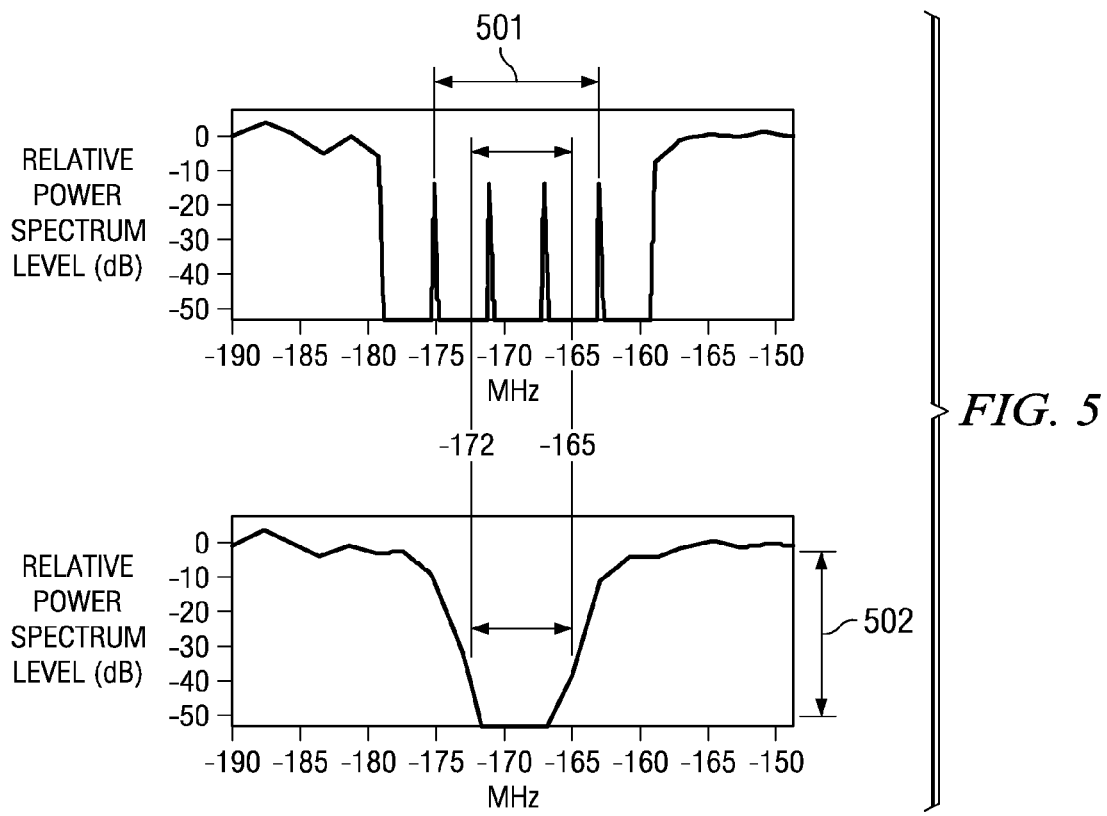
FIG. 5 illustrates interference suppression effects at the interference band position for (A) residual interference after zeroing five tones and (B) interference suppressed by AIC.

FIG. 4 illustrates that this invention works successfully if only five tones 401 are used to cancel the interference to the 7 MHz band. Negative interference from these five tones affect active interference cancellation resulting in greater than 50 dB reduction 402 of interference in the band of interest. The technique of the present invention can achieve even larger than 50 dB suppression of the interference. This is not generally attainable by the zero-tone approach. FIG. 5 illustrates the interference band position depicted in FIG. 4, enlarged to clarify the interference suppression effects. Reference 501 indicates the five tones. Greater than 50 dB reduction 502 of interference is realized in the band of interest.

Note that the tones within the interference band now transmit power and this causes interference to the original data tone as illustrated in FIG. 3d. Note also that in OFDM such interference does not affect the actual data provided frequency synchronization is achieved between the transmitter and receiver. Because such techniques are well established, interference from the non-zero tones within the interfering band is considered not significant.

Consider how the tone values are computed. In OFDM, the information data is modulated on each tone and the resulting set of tones is subjected as a data vector to an Inverse Fast Fourier transform (IFFT) and low-pass filtering. At the receiver, the received signal is subjected to a Fast Fourier transform in order to recover the original data vector. In the general OFDM systems, the IFFT and FFT pair is synchronized and data is mapped on the regular discrete frequencies that are multiples of the tone interval frequency. In MB-OFDM, the tone frequency is 4.125 MHz. Thus it is necessary to compute the signal spectrum only at the tone center frequencies. On the other hand, the interference to the victim systems occurs at frequencies in-between the tone frequency multiples. This requires computation of the spectrum of the transmitted OFDM signal at finer frequency grid. When the tones are zeroed, the largest interference power is usually located in the middle of two neighboring tones and up-sampling of the signal spectrum is necessary. Up-sampling by four has been found to be the optimal choice. Up-sampling by two does not adequately capture the interference in-between the tones and up-sampling by eight or larger results in an unduly large computational load on the hardware with minimal additional accuracy. In the following exampled, up-sampling by four is assumed.

In the following we consider the OFDM symbol for 128 tones. When the information data is represented as:

$$x(k), k=0 \ldots 127$$

the transmitted OFDM signal without low pass filter is:

$$x(n) = \sum_{k=0}^{127} X(k) \exp\left(j2\pi \frac{nk}{128}\right) \quad (1)$$

and the corresponding 4 times up-sampled spectrum:

$$Y(l), (l = 0 \ldots 4*(128-1)) \quad (2)$$

$$Y(l) = \frac{1}{128} \sum_{n=0}^{127} X(n) \exp\left(j2\pi \left(\frac{n}{128} \frac{1}{4}\right)\right)$$

Combining these two equations, we obtain as the relation between X and Y:

$$Y(l) = \frac{1}{128} \sum_{n=0}^{127} \left( \sum_{k=0}^{127} X(k) \exp\left(j2\pi \left(\frac{n}{128}\left(k - \frac{1}{4}\right)\right)\right)\right) \quad (3)$$

$$Y(l) = \frac{1}{128} \sum_{k=0}^{127} X(k) P(l,k)$$

where: P is the kernel of the transform.

Figure 6:
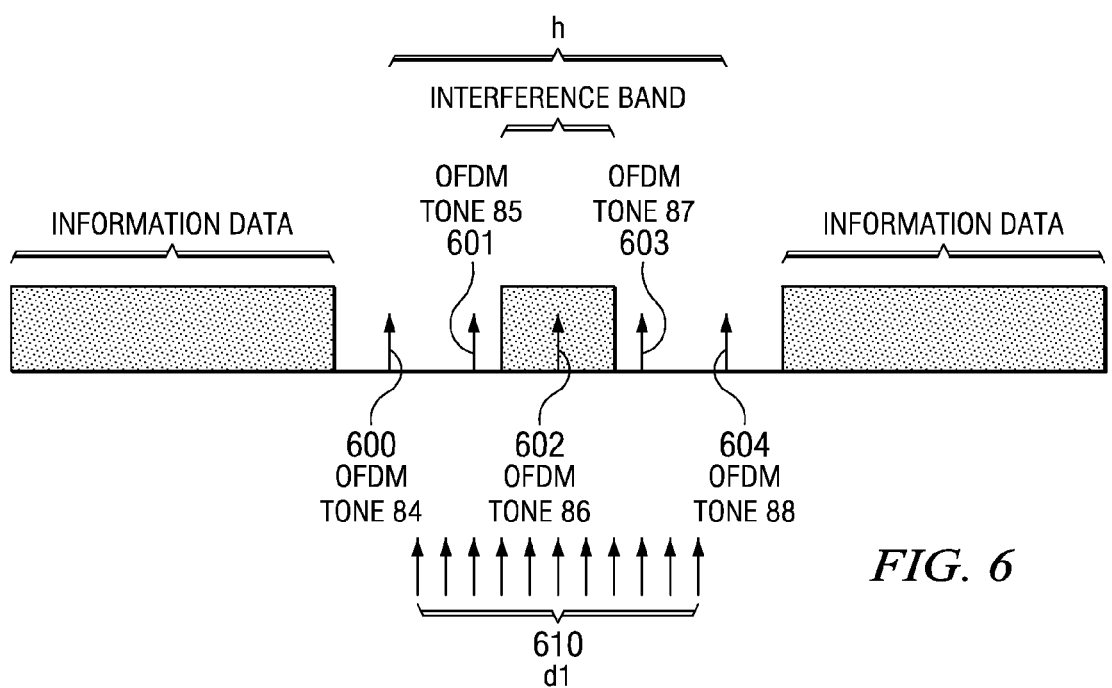
FIG. 6 illustrates graphically the computational details of active interference cancellation.

FIG. 6 illustrates the relationship between the tones used for the AIC and the position of the interference band. This example an interference band of 7 MHz width is co-located with the OFDM tone 85 602, tone 86 602 and tone 87 603. FIG. 6 illustrates two outside tones, tone 600 84 and tone 88 604. The interference to this band is evaluated at four-times finer frequency grid indicated by the vector d1 610. According to the basic concept described in FIG. 3c, vector d1 610 can be computed as the values of Y(l) where the index l corresponds to the four-times up-sampled frequency position in the interference band. In this example, l takes on the values 340 to 348 and X(84) to X(88) are reduced to zero. For effective interference cancellation to prevent exceedingly large tone values, we add one tone to each side of these three tones and attempt to cancel the interference using the five tones. These outer two tones contribute to a greater degree to interference suppression than the middle three tones. On the other hand increasing the number of the tones, for example to seven, contributes less to the overall performance. Thus the current method of this invention appears to be the optimum choice. Thus vector $d_1$ 610 is:

$$d_1 = Pg \quad (4)$$

where: P is the kernel defined by equation (3); and g is the vector of the information data with X(84) to X(88) forced to be zero.

In the next step, according to FIG. 3d, we compute the negative of the interference signal using the tones X(84) to X(88). Again using equation (3) and setting all the X to zero except for X(84) to X(88), we can derive the equation to solve for h as:

$$P_1 h = -d_1 \quad (5)$$

where: h is the column vector of X(84), ... X(88): and $P_1$ is the small kernel derived from P by limiting the index according to h and $d_1$. Thus $P_1$ is a 9 by 5 matrix.

According to the explanation relative to FIG. 3, the solution of equation (5) for h yields the desired tone values. However, Equation (5) cannot be solved in a straightforward manner because the matrix $P_1$ has no inverse. Hence, instead, we seek for the minimization of:

$$e^2 = \|P_1 h + d_1\|^2 \quad (6)$$

which results in:

$$h = -(P_1^T P_1)^{-1} P_1^T d_1 = -W_1 d_1 \quad (7)$$

This minimum mean-squared solution is also known as the Moore-Penrose generalized inverse and the resultant inverse 5 by 9 matrix $W_1$ in Equation (7) can be pre-computed because the interference band location is known.

Now combining Equations (4) and (7) we have:

$$h = -W_1 Pg = W_2 g \quad (8)$$

where: $W_2$ is a pre-computed 5 by 128 matrix.

The AIC tone coefficients h are dependent on the random information data vector g, but the AIC tone coefficients have interesting characteristics. The coefficients usually derived are, for example:

X(84)=−1.5384−1.6723j
X(85)=0.0278+0.0493j
X(86)=0.0004−0.0022j
X(87)=−0.0064−0.0234j
X(88)=−0.1855+1.7943j have near-zero values in the middle, and only the two side coefficients contribute significantly to the interference cancellation. This implies a drastic simplification for the interference cancellation. We denote the edge coefficient pair as (a=X (84), b=X (88)) and also denote the first and the last row of the 5×128 matrix $W_2$ as $W_a$ and $W_b$. These are pre-computed constant vectors. The computation of (a, b) is executed as the simple inner product of the information data vector g, and the as $W_a$, $W_b$ coefficient vectors. Complex multiplication is not really necessary because the information data transmitted in MB-OFDM is only complex binary values (1+j, etc.). Thus the complex multiplier and the coefficient tables $W_a$, $W_b$ can be replaced by tables storing:

real $(W_a)$+j*imag$(W_a)$,
real $(W_a)$−j*imag$(W_a)$,
−real $(W_a)$+j*imag$(W_a)$
−real $(W_a)$−j*imag$(W_a)$, and so forth.

When these tables are implemented in RAM, AIC can be implemented in the most flexible manner because it can shift the interference cancellation band location under the software control.

From Equation (8), we know that the computation of the interference cancellation tones is a matrix multiplication. In order to compute each interference cancellation tone, we need to multiply 128 input data (actually pairs of bits in QPSK).

This is formulated as 128 complex numbers, with 128 coefficients of the matrix $W_2$ of known coefficients.

It was shown in FIGS. 4, 5 and 6 that among the five tones, only the two tones on the edge are significant and others can be ignored. Computation of the two tones is implemented as illustrated in FIG. 7.

Figure 7:
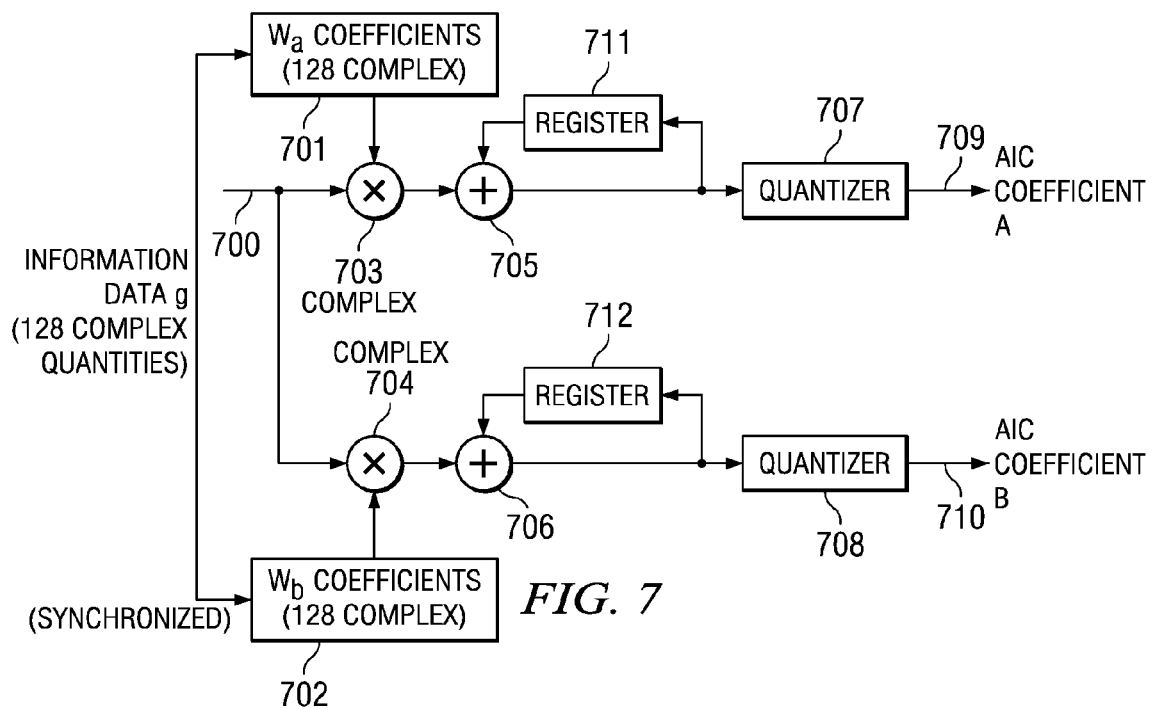
FIG. 7 illustrates the computational hardware block diagram for structured active interference cancellation (AIC)

FIG. 7 illustrates a functional block diagram of the hardware required to compute the AIC coefficients in AIC block. A first matrix multiplication is performed in multipliers 703 and 704 according to equation (8). Inputs to the multiplications 703 and 704 are derived from information data g 700, and the $W_a$ coefficients 701, and $W_b$ coefficients 702. The output of matrix multiplication 703 is then summed with the output of recirculation register 711 in adder 705 to form the input to quantizer 707. Similarly, the output of matrix multiplication 704 is then summed with the output of recirculation register 712 in adder 706 to form the input to quantizer 708.

The outputs from the summing functions 705 and 706 are subjected to quantization in quantizer blocks 707 and 708 respectively. The resulting tones 709 and 710 are inserted into the zero tone position of FIG. 3b. The resulting set of data is converted via IFFT and gives the desired transmitted signal.

Figure 8:
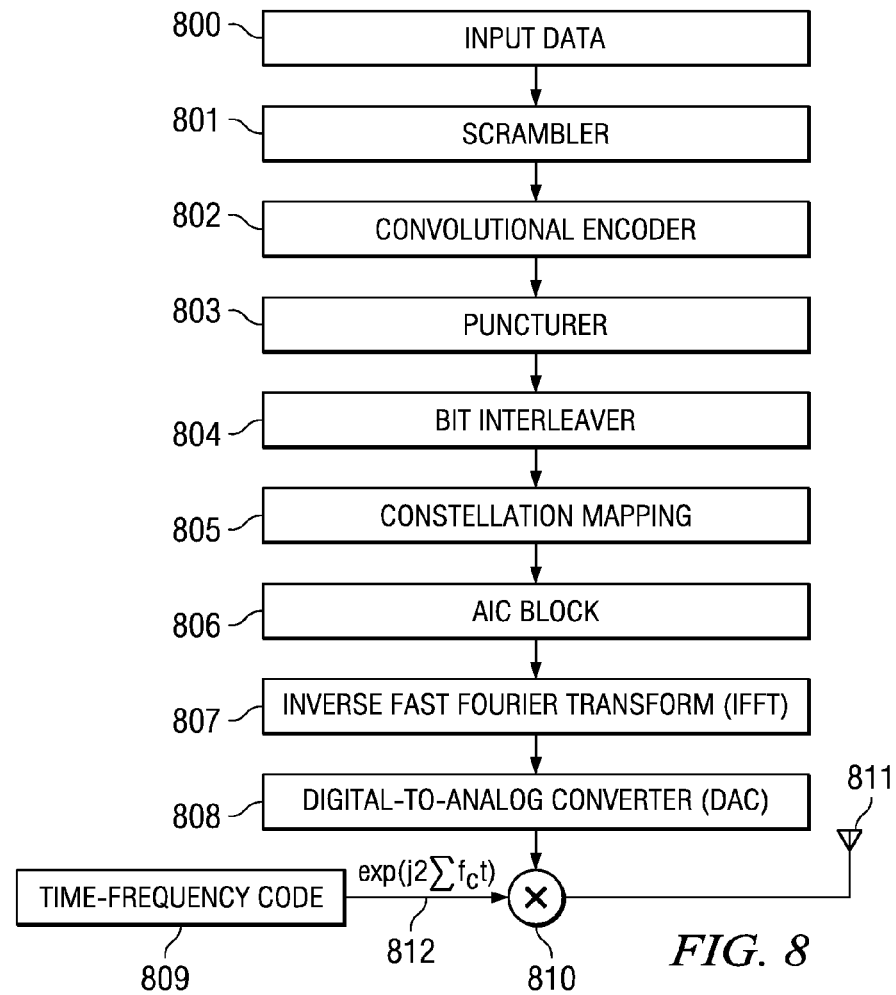
FIG. 8 illustrates the location of the AIC processing block added within the OFDM transmitter.

FIG. 8 illustrates the steps of this invention. Input data 800 is pre-processed by the following blocks: scrambler 801, convolutional encoder 802, puncturer 803 and bit interleaver 804. Following this block 805 performs convolutional mapping and the data is ready for processing in the active interference cancellation (AIC) block 806. The AIC block 806 is illustrated in detail in FIG. 7. Following the AIC processing normal flow for the decoding of the input data 800 resumes in inverse Fourier Fast Transformation (IFFT) block 807 and the digital-to-analog conversion block 808. The digital multiplier function 810 completes the required multiplication introducing the time-frequency code $\exp(j2\Sigma f_c t)$ 812 from block 809. Output from the digital multiplier 810 passes to antenna 811.

Figure 9A:
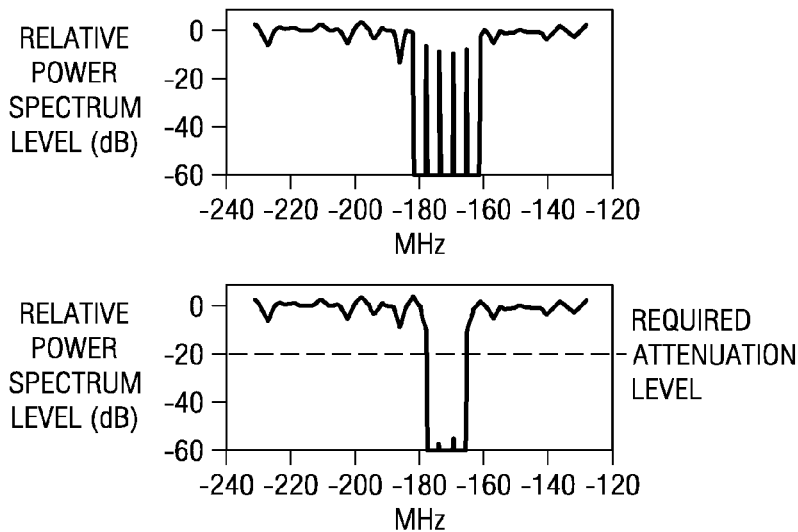
FIG. 9 illustrates the resulting cancellation for three possible levels of quantization for the AIC coefficients.
Figure 9B:
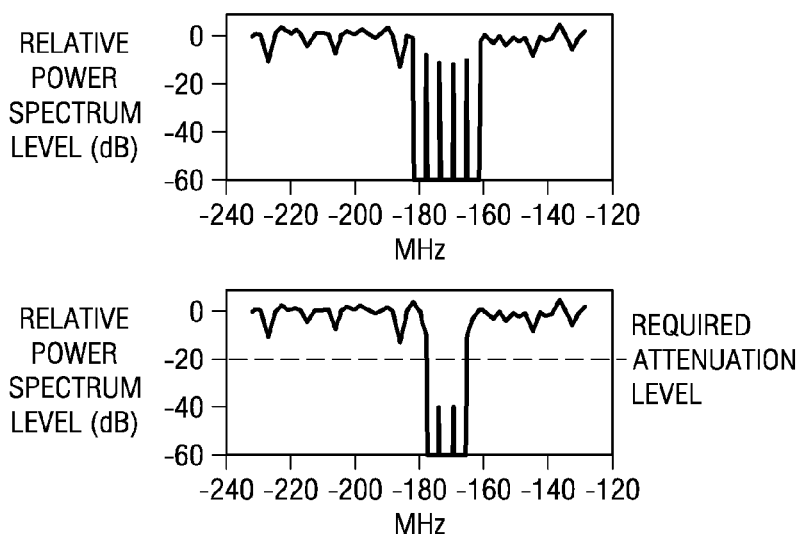
Figure 9C:
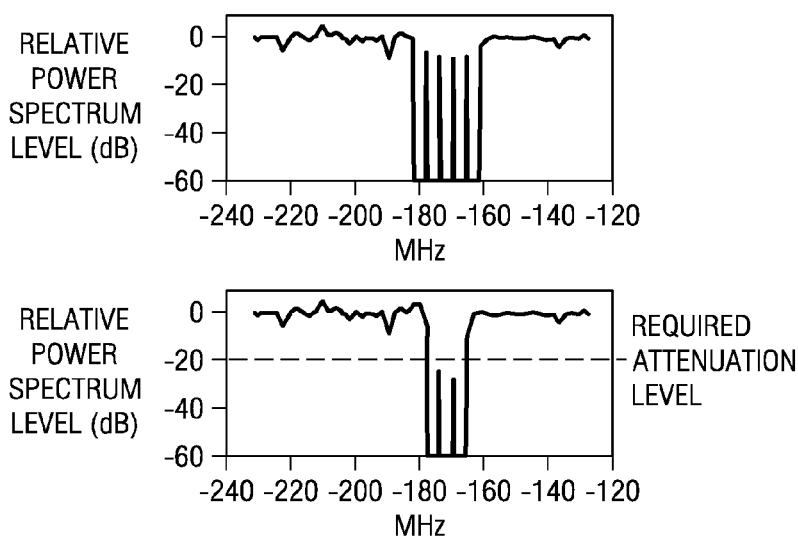

FIGS. 9a, 9b and 9c illustrate the results from 8-bit quantization (FIG. 9a), 4-bit quantization (FIG. 9b) and 2-bit quantization (FIG. 9c). Input data to the IFFT must be quantized and the resolution of the quantization affects the resulting interference cancellation property. Fine quantization, as shown in FIG. 9a with 8-bit quantization results in greater notch depth, but the actual implementation becomes expensive. The crucial point in the design is establishing the optimum point for the tradeoff between effective interference cancellation and design complexity.

FIGS. 9a, 9b, and 9c illustrate that if 20 dB of cancellation notch depth is required, the required resolution is only 2 bits, and if a 40 dB notch is required, the required resolution is 4 bits. For a practical application, two to four bits are well within acceptable range.

What is claimed is:

1. A method of interference cancellation in a victim band for application in multi-band orthogonal frequency division multiplex (OFDM) system transmitters comprising the steps of:

storing the pre-computed coefficients of first and last row of transform matrix;

convolving the pre-computed transform matrix with a current information data vector for frequencies within victim band and two adjacent frequencies, said convolving step including multiplying the current information data vector by recalled coefficients forming a product, computing the sum of the product with a prior value of the product, quantizating the sum, and modulating the tone by the quantized sum;

transmitting OFDM tones on said two adjacent frequencies outside the victim band to eliminate interference within the victim band according to the convolution results; and transmitting eliminating tones within the victim band to cancel interference within victim band by caused by said OFDM tones outside the victim band.

2. An apparatus for computing active interference coefficients for two bands adjacent to and outside a victim band in multi-band orthogonal frequency division multiplex (OFDM) comprising:

a first memory storing pre-computed $W_a$ coefficients;

a first matrix multiplier having a first input connected to said first memory for receiving said pre-computed $W_a$ coefficients, a second input receiving data to be transmitted by said multi-band orthogonal frequency division multiplex (OFDM) and a matrix product output;

a first adder having a first input connected to said matrix product output of said first matrix multiplier, a second input and a sum output;

a first recirculation register having an input connected to said sum output of said first adder and an output connected to said second input of said first adder;

a first quantizer having an input connected to said sum output of said first adder and an quantized output being a quantization of said input according to a predetermined quantization, said quantized output being active interference coefficients for a first of said two bands;

a second memory storing pre-computed $W_b$ coefficients;

a second matrix multiplier having a first input connected to said second memory for receiving said pre-computed $W_a$ coefficients, a second input receiving said data to be transmitted by said multi-band orthogonal frequency division multiplex (OFDM) and a matrix product output;

a second adder having a first input connected to said matrix product output of said said matrix multiplier, a second input and a sum output;

a second recirculation register having an input connected to said sum output of said second adder and an output connected to said second input of said second adder; and a second quantizer having an input connected to said sum output of said second adder and an quantized output being a quantization of said input according to a predetermined quantization, said quantized output being active interference coefficients for a second of said two bands.

* * * * *

UNITED STATES PATENT AND TRADEMARK OFFICE
CERTIFICATE OF CORRECTION

PATENT NO. : 7,573,960 B2
APPLICATION NO. : 11/356780
DATED : August 11, 2009
INVENTOR(S) : Hirohisa Yamaguchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Seventh Day of September, 2010

David J. Kappos
*Director of the United States Patent and Trademark Office*